United States Patent [19]
Landmeier

[11] Patent Number: 5,345,044
[45] Date of Patent: Sep. 6, 1994

[54] CORDLESS DIGITIZER USING ELECTROMAGNETIC LOCATING SIGNALS

[75] Inventor: Waldo L. Landmeier, Phoenix, Ariz.

[73] Assignee: CalComp, Inc., Anaheim, Calif.

[21] Appl. No.: 875,841

[22] Filed: Apr. 29, 1991

[51] Int. Cl.[5] .......................................... G08C 21/00
[52] U.S. Cl. ..................................................... 178/19
[58] Field of Search ................... 778/19, 18; 340/712; 345/173, 179, 157

[56] References Cited

U.S. PATENT DOCUMENTS

| | | | |
|---|---|---|---|
| 3,689,885 | 9/1972 | Kaplan et al. | 340/152 T |
| 4,023,167 | 5/1977 | Wahlstrom | 343/6.5 SS |
| 4,054,746 | 10/1977 | Kamm | 178/19 |
| 4,423,286 | 12/1983 | Bergeron | 178/19 |
| 4,672,154 | 6/1987 | Rodgers et al. | 178/19 |
| 4,704,501 | 11/1987 | Taguchi et al. | 178/19 |
| 4,734,546 | 3/1988 | Landmeier | 178/19 |
| 4,786,765 | 11/1988 | Yamanami et al. | 178/19 |
| 4,795,858 | 1/1989 | Yamazaki | 178/19 |
| 4,878,553 | 11/1989 | Yamanami et al. | 178/18 |
| 5,095,180 | 3/1992 | Yamamoto | 178/19 |

*Primary Examiner*—Stephen Chin
*Assistant Examiner*—Paul Loomis
*Attorney, Agent, or Firm*—Cesari and McKenna

[57] ABSTRACT

In order to determine without ambiguity the grid sections on which the pointer is located in a cordless electromagnetic digitizer having x and y locating grids, a third, "phase" grid has conductors that form elongated, narrow open loops, spaced so that each location on the work surface is enclosed by loops formed by a minority of the phase grid conductors. Any phase grid conductor with sufficient induced voltage can serve as a phase reference to determine the relative phases of the signals induced in all of the phase grid conductors. A phase grid conductor determined to have the relative phase of the minority can then serve as phase reference to identify the locating grid section unambiguously, and digitize the pointer location.

21 Claims, 4 Drawing Sheets

CORDLESS DIGITIZER USING ELECTROMAGNETIC LOCATING SIGNALS

FIELD OF THE INVENTION

This invention relates to graphic digitizers, that is, systems for translating the physical position of a pointer relative to a grid of spaced conductors into electrical signals for use by a utilization device. More particularly, it relates to a digitizer system having a cordless pointer and using electromagnetic locating signals.

BACKGROUND

Digitizers, as known in the art, are very useful for translating the position of an item in a plan or drawing into coordinates recognizable by a computer. In the latter form, the computer can make use of the position information in any number of useful ways. Unlike the position information from a mouse, which is always relative to its immediately previous position on a support surface, the digitizer position information is relative to a grid of conductors incorporated into its work surface. It becomes, therefore, absolute with respect to the work surface and any plan or drawing mounted thereon in a designated orientation. As a result, the position information is accurate enough not only to edit graphic displays, but also to control manufacturing processes according to scale drawings placed on the work surface, and to control navigation of air and water craft according to charts.

A number of well known digitizer systems make use of a movable coil and a work surface defined by a grid of conductors. The coil may be disposed within the tip of a pen-shaped instrument so that the pen point accurately locates the effective coil center. Alternatively, the coil may surround a transparent disc with a set of cross hairs etched thereon to mark the coil center in what is known as a cursor. The grid normally comprises a set of parallel conductors spaced along the work surface in what may be called the x direction and another set similarly disposed along the work surface in the orthogonal y direction. An oscillator applies an ac signal of predetermined frequency and amplitude to the coil, which is inductively coupled to the conductors of the grid.

In accordance with the principles of well known electromagnetic theory, ac electrical signals are induced in the grid conductors at a magnitude and phase that depend on the location of the coil relative to the conductors. Generally, the signals induced in the conductors will have a magnitude that varies from zero at the coil center to a maximum at the coil periphery and tapering off beyond. Further, the phase of the signals induced in conductors at one side of the coil will be the opposite of (180 degrees displaced from) that of signals induced in conductors at the other side. Both of these electromagnetic properties are used to advantage in several known digitizers.

In these known systems, individual conductors are selectively connected, one at a time, through the use of multiplexer circuitry, to detection circuitry that determines both the phase and the magnitude of the signal induced in the selected conductor. When, for example, a conductor of the x set is selected by the multiplexer circuitry, the phase of the induced signal indicates whether the pointer is to the right or to the left of the selected conductor. The x grid may therefore be scanned by selecting conductors in succession from one end of work surface, until the phase of the induced signal reverses. The phase reversal identifies the two adjacent conductors between which the pointer is located. The precise position of the pointer between the identified adjacent conductors may then be determined by the relative magnitudes of induced signal in the identified conductors.

In the digitizer described in U.S. Pat. No. 4,734,546, which is incorporated herein by reference, and which issued on Mar. 29, 1988 to Waldo L. Landmeier, the current inventor, each conductor is looped through several areas of the work surface to reduce the number of conductors in each grid set. Looping, of course, generates segments of each conductor in which the direction across the work surface of a continuous conductor current is reversed. These segment direction reversals are observed by the detecting circuitry as phase reversals of the induced signal. Selective conductors are looped in different manners so that, in each work surface area, the combination of conductor segment directions is unique. Since the phase of the signals induced in all conductor segments to one side of the pointer is the same, the pattern of observed phase reversals among the combination of conductors is used to uniquely identify the particular area of the work surface on which the pointer coil is located. Phase reversals due to segment loop direction are then compensated for, and pointer location within the area proceeds normally.

Since the number of individual conductors to be scanned is greatly reduced by the Landmeier looping grid system, so too is the number of multiplexers required for each grid, and the attendant complexity of the pointer locating circuitry. This represents a substantial cost saving as well as a reduction in coil locating time. Obviously, however, the pointer locating circuitry does require a constant phase reference relative to the sending coil signal to unambiguously define the specific loop area in which the coil is located. This presents no problem in a digitizer system with a tethered pointer, whether the oscillator is located in the pointer or the base unit, for a phase reference signal can be carried in the tether cable. Since a tethered pointer tends to impede the pointer's movements, however, many users prefer an untethered pointer.

In U.S. Pat. No. 5,045,645 by Jason J. Hoendervoogt and James S. Watson, entitled "Digitizer System With Passive Pointer", and assigned to the assignee hereof, the required phase reference information is supplied electrostatically by capacitive coupling between the pointer and the base electronics. While this is a very effective and desirable solution, it does, nevertheless, impede if not preclude the use of electrostatic force to hold the work to the work surface. Electrostatic holding techniques, on the other hand, are very effective, inexpensive and commonly used in the digitizer industry.

An object of the present invention is to provide a digitizer system having an untethered pointer that supplies full phase information without relying on electrostatic coupling of a phase reference signal between pointer and base electronics.

Another object is to provide a cordless digitizer system utilizing electromagnetic locating signals.

Another object is a digitizer system having an untethered pointer, looping grids and electrostatic work holddown.

SUMMARY OF THE INVENTION

In a digitizer system embodied in accordance with the present invention, a coil is carried by a pointer and energized by an ac signal. A first grid of spaced conductors defines a work surface and is inductively coupled to the coil. A phase grid in which the spaced conductors form overlapping loops is also inductively coupled to the coil. The loops are formed in one direction only and spaced so that all locations on the work surface lie within loops formed by a minority of the phase grid conductors. From among the phase grid conductors, a conductor is selected that forms a loop enclosing the center of the coil. A phase reference signal that has a constant phase in relation to the ac signal is produced from the signals induced by the coil in the selected phase grid conductor. The location of the pointer relative to the first grid conductors can then be determined unambiguously in response to the signals induced in selected ones of the first grid conductors and the phase reference signal. To determine which conductors form loops that enclose the coil, the relative phase of the voltages induced in all of the phase grid conductors can first be determined. Because all of the loops are formed in the same direction, the conductors of the same relative phase which form the minority are those that enclose the coil, and are thereby suitable for generating the phase reference signal.

DRAWING DESCRIPTION

The foregoing and other features and advantages of this invention will be better understood from the following detailed description taken with the accompanying drawings in which.

Figure 1:
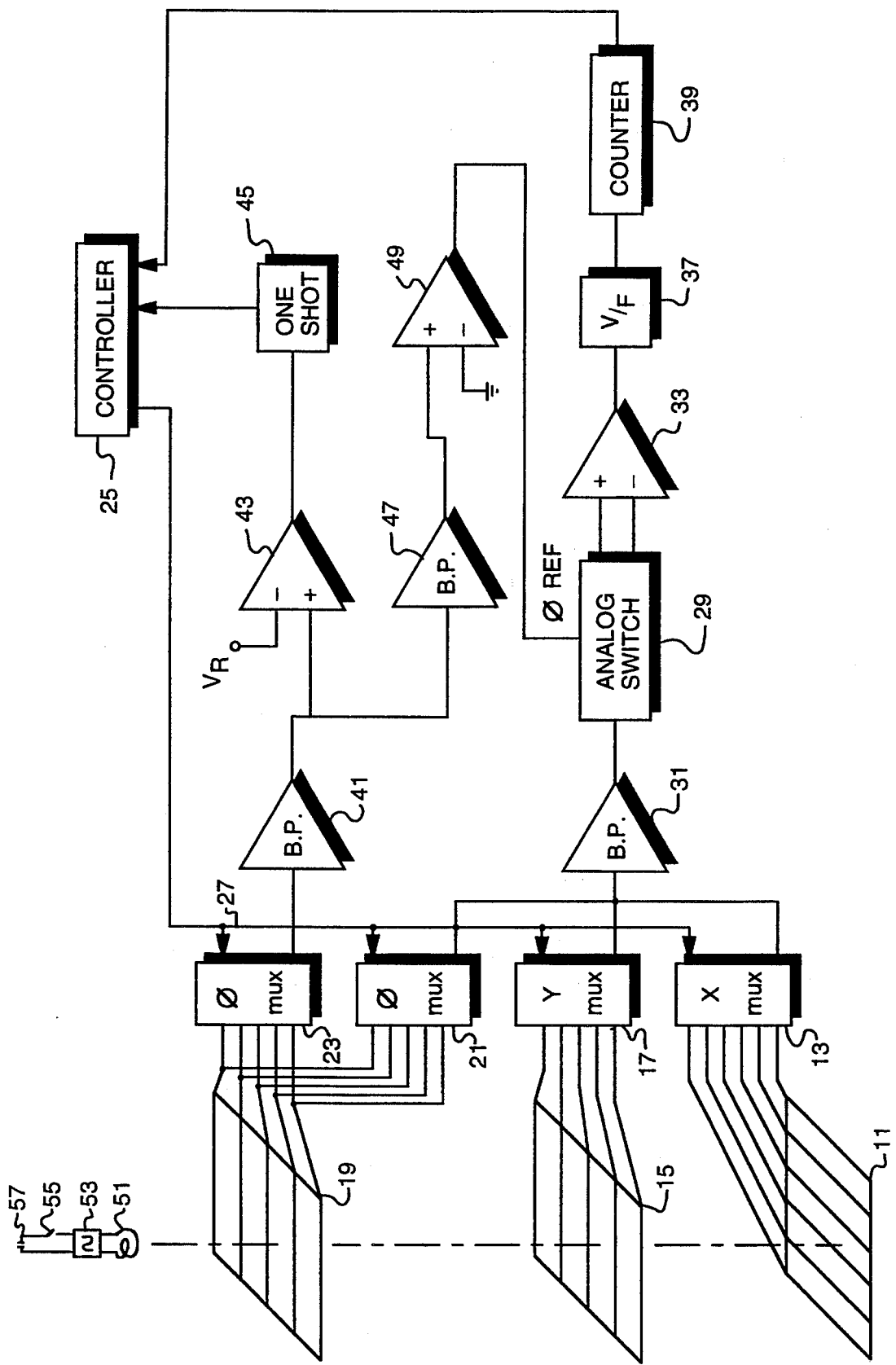
FIG. 1 is a block diagram of a particularly useful embodiment of the invention.
Figure 3A:
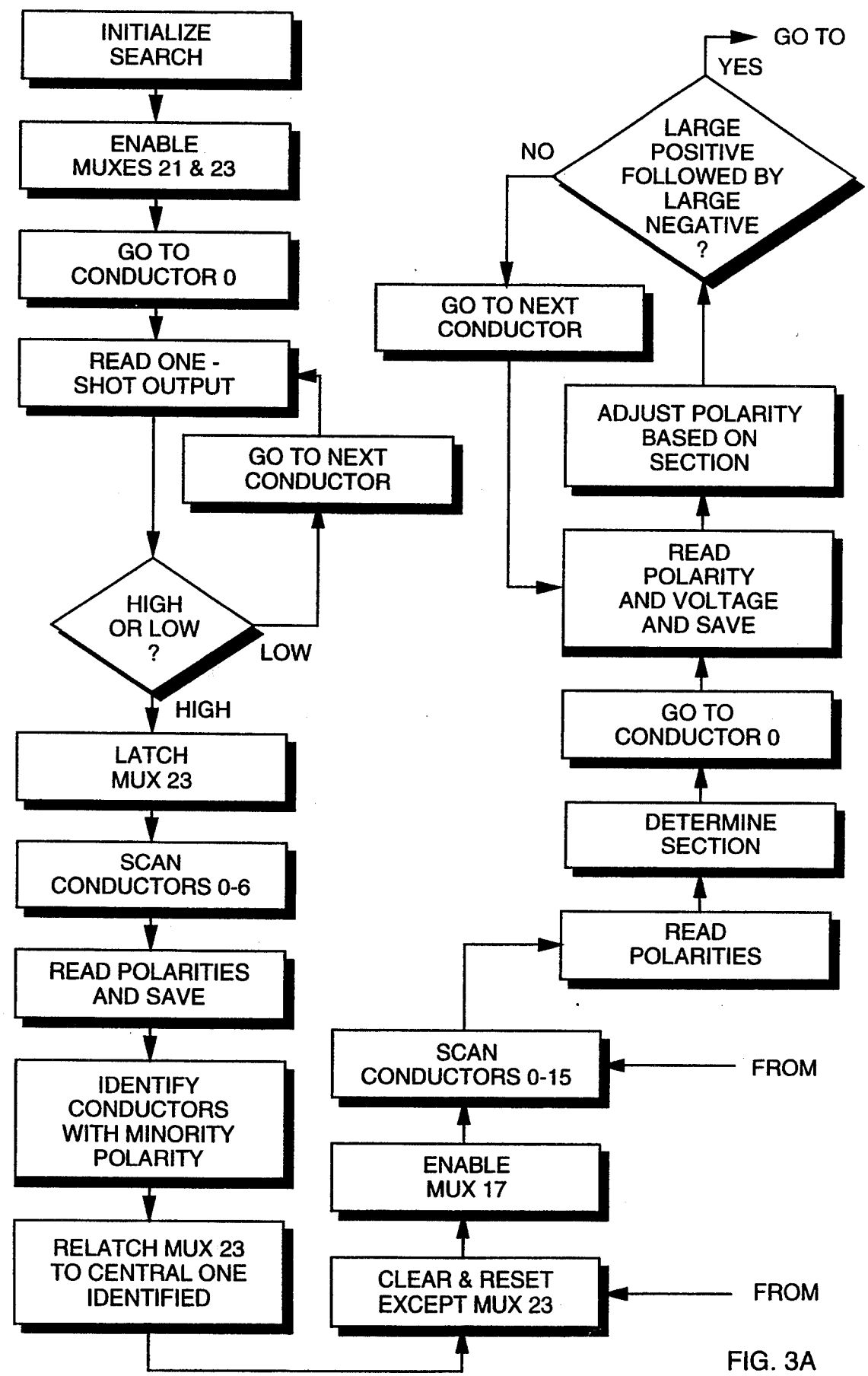
Figure 3B:
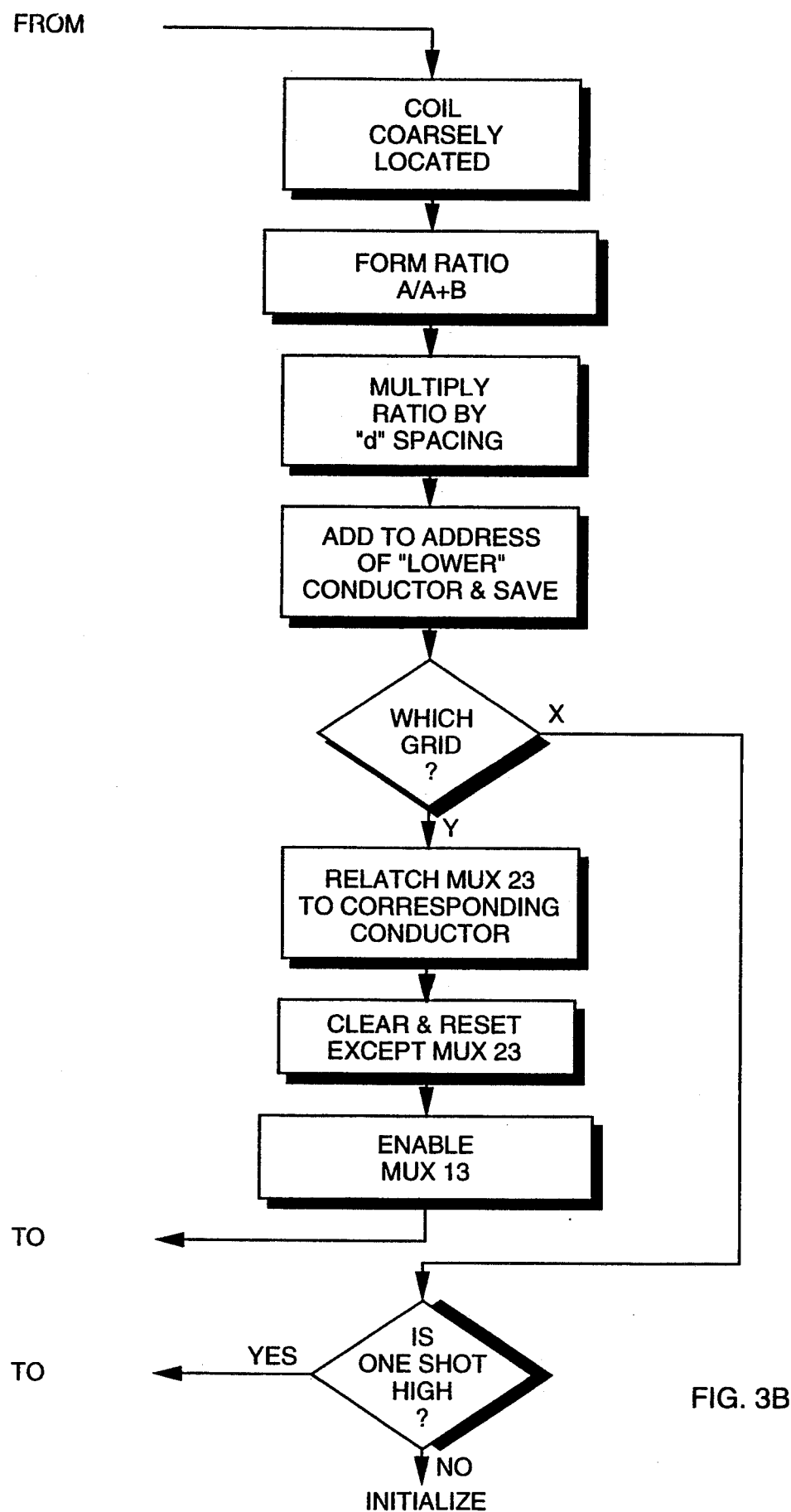

FIGS. 3a-b is a flow diagram illustrating a process which may be executed by the controller in the embodiment of FIG. 1.

DETAILED DESCRIPTION

The structure of an illustrative embodiment of the invention will first be explained with reference to FIGS. 1 and 2.

In FIG. 1, a grid 11 of parallel conductors, which may advantageously be of the Landmeier looping type (see U.S. Pat. No. 4,734,546 which is incorporated herein by reference), is connected via the individual conductors to a multiplexer 13. Similarly, a grid 15, whose conductors lie orthogonal to those of grid 11, is connected to a multiplexer 17. Grids 11 and 15, according to usual practice, are located in a base unit of the digitizer and define the digitizer's work surface. The conductors of grid 11 may be considered to lie parallel to the vertical, allowing determination of the pointer location in the horizontal direction; grid 11 may thus be referred to as the x grid, and grid 15 as the y grid. A third grid 19 located in the digitizer base unit has its conductors connected to two multiplexers 21 and 23. Since it is for receiving phase information from the coil in the pointer according to the invention, grid 19 will be called a phase grid. Although shown separated for clarity, grids 11, 15 and 19 are all physically so close together as to be considered substantially in the same plane. Multiplexers 13, 17, 21 and 23 may all be connected to a controller 25 via a digital bus 27. The outputs of multiplexers 13, 17 and 21 are all connected to the signal input of an analog switch 29 via a bandpass amplifier 31. In addition to its signal input, switch 29 has a phase reference input and two outputs. The outputs are connected to the inputs of a comparator 33, the output of which is connected to an analog-to-digital converter, which may comprise a voltage-to-frequency converter 37 and a counter 39. The digital count output of counter 39 is fed to controller 25.

The output of multiplexer 23, after amplification by a relatively wide bandpass amplifier 41, may be split into two paths. A first path includes a comparator 43 and a oneshot 45, which communicates back to controller 25. The other path includes a bandpass amplifier 47 and a comparator 49. The output of comparator 49 is fed to the phase reference input of analog switch 29. A source of reference voltage VR is connected to the inverting input of comparator 43. Finally, a coil 51, located in an untethered pointer is driven by an oscillator 53, which may in turn be selectively powered by a battery 57 through a switch 55.

In operation, each of the multiplexers can be enabled or disabled, and any one of its signal inputs can be connected to its output selectively in accordance with a specific address transmitted from controller 25 over bus 27. In addition, multiplexer 23 can be latched to keep a specified signal input connected to its output while addresses on bus 27 change. An ac signal in coil 51 induces ac signals in all of the conductors of all three grids. The induced voltages on specific conductors, as selected by controller 25, are therefore connected to band pass amplifiers 41 and 31. When the voltage output of amplifier 41 exceeds a threshold determined by the reference voltage VR, the output of comparator 43 becomes positive to trigger one shot 45, changing its output from low to high. This information is received by controller 25. Comparator 49 changes the sine wave on its input, an amplified replica of the induced voltage on the selected phase grid connector, to a square wave to provide a more decisive phase reference voltage to analog switch 29.

Analog switch 29 and differential amplifier 33 operate as a phase demodulator. Switch 29 may be considered a double-pole double-throw reversing switch under control of its phase reference input. One signal output is connected to system ground, the other to the signal input. When the polarity of the phase reference signal reverses, its two outputs are interchanged; i.e., the output that was connected to ground is connected to the signal input, and the output that was connected to the signal input is connected to ground. The output of comparator 33 is thereby a unipolar signal; with zero signal into switch 29, comparator 33 output is at its midpoint. The difference between the comparator output signal and the zero signal level represents the magnitude of the induced signal on the selected grid conductor, and the sign of the difference represents the phase of the induced signal. Voltage-to-frequency converter 37 and counter 39 form a convenient analog-to-digital converter for conveying the induced signal magnitude and phase information to controller 25.

As previously indicated, according to electromagnetic theory, the voltage induced in parallel conductors by an alternating current in a coil will be maximum in conductors located at the coil periphery and will be of opposite phase in conductors located on opposite sides of the coil center. If two conductors in close proximity to, but on opposite sides of the coil are joined to form a loop encircling the coil, therefore, their induced voltages will add in phase. Further, if a grid includes several conductors, each forming a loop in the vicinity of the coil, the voltage induced in every conductor that encircles the coil center will be of one phase, while that induced in every conductor that does not encircle the coil center will be of the opposite phase. The phase grid and its connecting circuitry take advantage of these principles according to the invention to provide a strong phase reference voltage of unambiguous phase for demodulating the signals induced in the x and y location grids.

Figure 2:
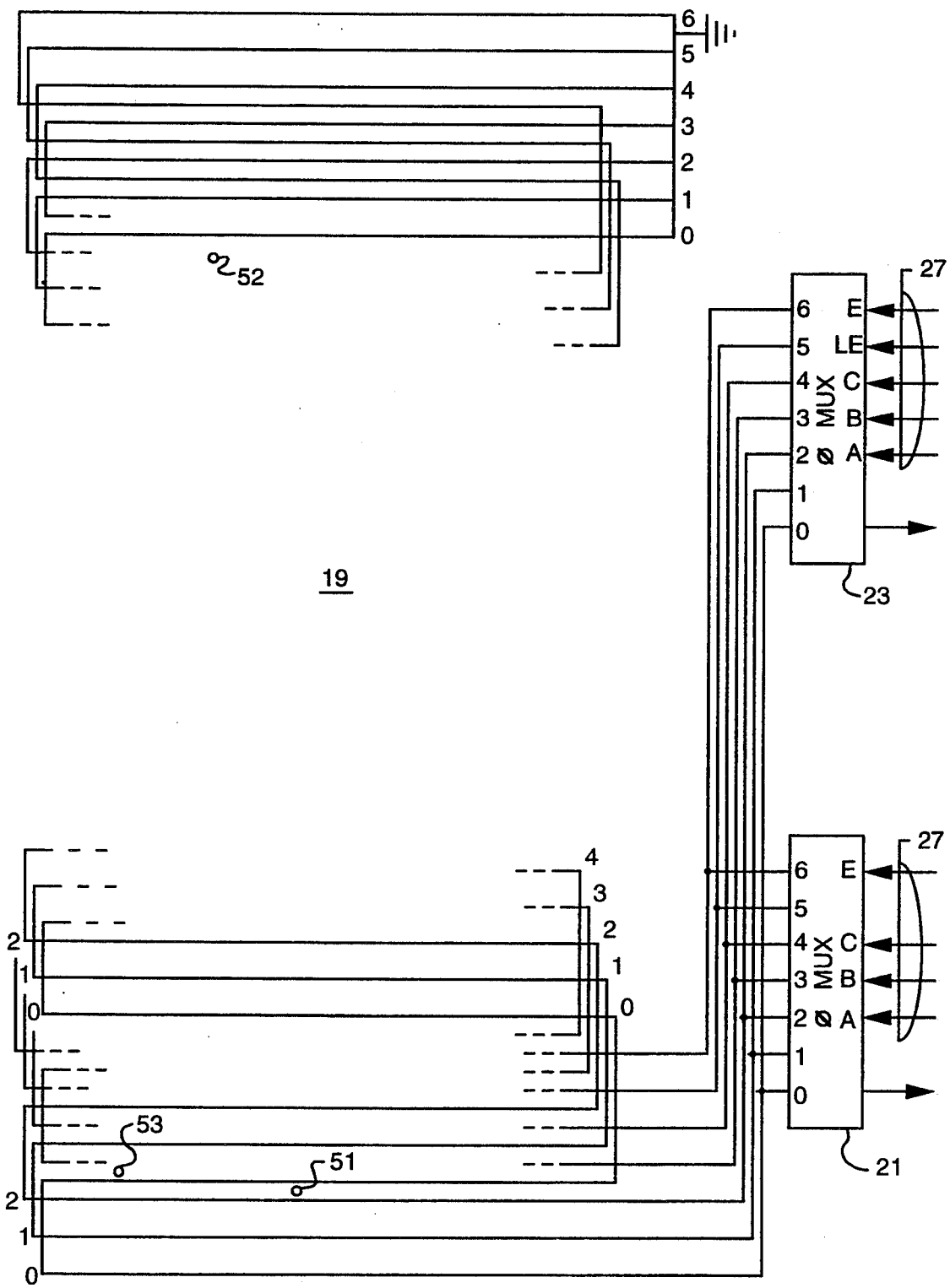
FIG. 2 is a diagram illustrating a phase grid layout which may be used in the embodiment of FIG. 1.

A suitable phase grid for practicing the invention is shown in FIG. 2. Grid 19 may comprise seven separate conductors, numbered 0 through 6, that are woven back and forth across the work surface in a repetitive manner to cover the whole work surface. Each conductor forms a series of spaced, narrow, elongated loops, open at one end. Starting at its connection to the two multiplexers, for example, conductor 2 crosses the work surface toward the left side of FIG. 2 and spans four other conductor segments on the left before it returns back across the work surface to form a first elongated loop. It then turns up along the right side of the work surface and spans eight conductor segments before returning across the work surface to begin another elongated loop. It is important to note that what is considered an elongated loop is that formed by two conductor segments which cross the work surface and the short segment that joins them along the left side. The right side of the loop is open. Tracing the conductors from the multiplexers, therefore, all of the loops are formed in the same direction, in this case clockwise. Most of the spanned conductor segments have been at least partially left out of FIG. 2 for clarity. The pattern may be repeated several times, spanning four conductors along the left edge and eight along the right edge, until finally ending in a ground connection at the top of the work surface. The other conductors follow a similar pattern, in order. At the top and bottom of the work surface, although the number of conductors spanned diminishes, the span lengths remain the same. All of the conductor segments shown as vertical in FIG. 2 are located off the edges of the active work surface. The loops, therefore, are as long as the work surface is wide. The length of the span that defines the width of the elongated loops should be short enough to insure that the voltage induced in a loop by the coil located anywhere within the loop will have sufficient magnitude for the phase reference circuit to function.

It will be recognized, of course, that many other suitable patterns exist for the phase grid. The invention would operate, for example, particularly for digitizers with a small work surface, with a single phase conductor formed as a single loop enclosing the work surface, or with more than one phase conductor, each of which forms only one loop; but which collectively enclose the work surface. For large work surface digitizers, however, a large number of phase conductors is preferred. In another arrangement that would be quite satisfactory, however, instead of the several loops formed by each conductor being connected in series, they could be connected in parallel. What is important is that the phase conductors used each form at least one loop, and that all of the loops formed by all phase conductors be formed in the same direction, clockwise or counterclockwise. With multiple phase conductors, the adjacent loops of such conductors preferably overlap, and there is preferably enough space between loops formed by a single conductor so that all locations on the work surface are enclosed by loops formed by a minority of the phase conductors. This also means that all locations on the work surface are outside of the loops formed by a majority of the phase conductors, and that phase conductors that exhibit the minority phase do in fact enclose the coil in a loop. The pattern of FIG. 2 has been preferred because it is simple to make and it has similar drive requirements to those of the x and y grids.

The phase grid may be manufactured together with the x and y grids by printed circuit techniques without any additional manufacturing steps. All of the conductors of all three grids, exclusive of cross-over areas may first be laid down, followed by laying down the cross-over insulation, and finally the cross-over connections. The cross-overs, of course, include not only those of the same grid, but those which would otherwise short circuit the conductors of one grid to those of another. This manufacturing process, besides yielding the phase grid at minimal extra cost, results in all three grids being effectively in the same plane. They are therefore equally sensitive to the electromagnetic signal transmitted by the coil in the pointer.

A particularly effective process for pointer location, utilizing the embodiment of FIG. 1, including looped x and y grids and an untethered pointer, is illustrated by the flow diagram of FIG. 3. After initialization, phase grid multiplexers 21 and 23 are enabled, and conductor 0 of grid 19 is connected to amplifiers 31 and 41. If the output of one shot 45 is low, indicating a very low signal magnitude in conductor 0, the address on bus 27 is changed to select the next conductor, which in this case is conductor 1. This selection process is iterated until the one shot is triggered, indicating a high enough induced voltage to provide a phase reference signal. Multiplexer 23 is then latched to maintain the connection of the phase reference signal while all of the conductors of the phase reference grid are scanned by multiplexer 21. The polarity of the induced signal on each phase grid conductor, as indicated by counter 39, is saved. Out of the seven separate conductors in the phase grid, two or three will have an induced voltage of one polarity, while the remaining conductors will have induced voltages of the opposite polarity. If the pointer is located at point 51 or 52 in FIG. 2, for example, both of which are within elongated loops formed by conductors 0, 1 and 2, but outside the loops formed by the remaining conductors, those three conductors will be of one polarity, while the four conductors 3 through 6 will be of the other polarity. On the other hand, a pointer location at point 53, which is within the loops of only conductors 1 and 2, will cause those two only to be of one polarity while the other five conductors are of the other polarity. Just which group, the minority or the majority, is positive, of course, depends on whether or not the pointer is within the loop of the conductor latched by multiplexer 23. Since that fact is not known, the phase of each group with respect to the coil is still ambiguous. To resolve the ambiguity, controller 25 goes on to identify the conductors of the minority polarity and relatches multiplexer 23 to the center one if there are three, or to the lower numbered one if only two. Because the phase grid was so designed, this step insures that the coil center is within a loop formed by the newly selected phase grid conductor, removing the phase ambiguity.

With the phase ambiguity thus removed according to the invention, the process then continues in the usual manner for looped conductor grids, as disclosed in the previously mentioned Landmeier patent. Multiplexer 23 remains latched while the other multiplexers are cleared and reset. Y multiplexer 17 is enabled, and all conductors are scanned while the demodulated polarities of the induced voltages are read to controller 25 from counter 39. Using the pattern of the conductor polarities, which is unique for each grid section, the controller accurately identifies the particular section on which the pointer is located. The y grid conductors are once again sequentially connected, one at a time, to amplifier 31, but this time both the polarity and the magnitude of the induced voltage are saved after the polarity of each voltage is adjusted in accordance with the direction in which each y grid conductor is looped in the identified section. The sequential selection process continues until a large positive induced voltage is immediately followed by a large negative induced voltage. The phase reversal indicates that the coil in the pointer is located between the two conductors of opposite phase. Controller 25 then forms a ratio from the magnitudes of voltage on the adjacent identified conductors, multiplies the ratio by the spacing between conductors, and adds the product to the lower conductor address. The resulting sum address is the y coordinate of the pointer.

The programmed process then relatches multiplexer 23 to the phase grid conductor that corresponds to the determined location of the pointer before going on to determine the x coordinate of the pointer location using multiplexer 13. While this step of updating the selection of phase grid conductor is by no means necessary to practicing the invention, it is very useful to keep the phase reference signal valid when the pointer is moving. After determining the x coordinate using the same steps as in the case of the y coordinate, the diagrammed program checks to see if the one shot output is still high. If it is high, the y coordinate can be redetermined without any of the initial phase grid scanning procedures; if not, the pointer has apparently moved so fast as to be out of range, running the risk of inverting the phase reference voltage, and the whole program is started anew. With this last decision step, the pointer coordinates can be continually updated even though the pointer is moving at a moderate rate.

I have thus described a new and improved digitizer that has an untethered pointer and, because it is fully electromagnetic, can use electrostatic holddown techniques to hold a paper on its work surface. Further, the improvements are easy and cost effective to produce. Other arrangements than those specifically shown and described herein will occur to those skilled in the digitizer art, which, nonetheless do not depart from the spirit and scope of the invention, as defined by the appended claims.

I claim:

1. A graphic digitizer for digitizing locations of a freely movable pointer relative to a base unit, said digitizer comprising:
   coil means carried by said pointer;
   a first grid of spaced conductors located in said base unit, said first grid comprising an x group of spaced conductors and a y group of spaced conductors said x group, said first grid defining surface on said base unit;
   a plurality of phase conductors located in said base unit, said phase conductors being formed as overlapping, elongated loops that collectively span all locations of the work surface defined by said first grid conductors;
   means for inductively coupling a phase reference signal between said coil means and one of said phase conductors;
   means for inductively coupling locating signals between said coil means and selected conductors of said first grid; and
   detecting means responsive to said inductively coupled locating signals and said inductively coupled phase reference signals for determining the location of said pointer relative to the work surface defined by said first grid.

2. A graphic digitizer as in claim 1 comprising at least three phase conductors located in said base unit, said phase conductors forming overlapping elongated loops, said loops being formed in one direction only and being spaced so that all locations of the work surface defined by said first grid conductors lie within loops formed by a minority of said phase grid conductors.

3. A graphic digitizer as in claim 2 further including selecting means for selecting from said phase conductors one that forms a loop enclosing the center of said coil means.

4. A graphic digitizer as in claim 1 wherein said x group of spaced conductors and said y group of spaced conductors are formed in an arrangement whereby a single wire is used to determine position in on the work surface.

5. A graphic digitizer as in claim 1 wherein said coil means is driven by an ac signal and wherein said phase reference signal coupling means produces a phase reference signal that has a constant phase in relation to said ac signal.

6. A graphic digitizer for digitizing locations of a freely movable pointer on a work surface, said digitizer comprising:
   a coil carried by said pointer and energized signal;
   a first grid of spaced conductors defining said work surface and inductively coupled to said coil;
   a phase grid of spaced conductors inductively said coil, said phase grid comprising phase conductors forming overlapping elongated loops, said loops being formed in one direction only and spaced so that all locations on said work surface lie within loops formed by a minority of said phase grid conductors;
   selecting means for selecting from said phase grid conductors a conductor that forms a loop enclosing the center of said coil;
   phase reference output means for producing, in response to the signal induced by said coil in said selected phase grid conductor, a phase reference signal having a constant phase in relation to said ac signal; and
   detecting means connected to said first grid conductors and said phase reference output means for detecting signals inducted by said coil in selected ones of said first grid conductors and for determining the location of said pointer relative to said first grid conductors in response to said first grid induced signals and said phase reference signal.

7. A graphic digitizer as in claim 6 wherein said selecting means comprises relative phase means for determining the relative phase of the signals induced in each of a plurality of adjacent phase grid conductors, said plurality of conductors being greater than twice the maximum number of elongated loops that enclose a single location on said work surface, and coupling means for coupling to said phase reference output means a phase grid conductor in which the induced signals have the relative phase of a minority of said plurality of conductors.

8. A graphic digitizer as in claim 7 wherein said plurality of grid conductors is the total number of grid conductors.

9. A graphic digitizer as in claim 7 wherein said relative phase means comprises:
  means for coupling to said phase reference output means a phase grid conductor having an induced signal amplitude that exceeds a predetermined amount; and
  means for coupling said plurality of conductors, one at a time, to said detecting means.

10. A graphic digitizer as in claim 7 wherein at least one of said phase grid conductors forms a plurality of said elongated loops.

11. A graphic digitizer as in claim 9 wherein said plurality of elongated loops are connected in a series circuit.

12. A graphic digitizer as in claim 6 wherein said first grid and said phase grid are located in substantially the same plane.

13. A graphic digitizer as in claim 12 wherein said first grid and said phase grid are produced by printed circuit techniques on the same substrate.

14. A graphic digitizer as in claim 6 wherein said digitizer further comprises a third grid of spaced conductors orthogonal to said first grid conductors and connected to said detecting means.

15. A graphic digitizer as in claim 14 wherein said first and third grids are formed in a looping arrangement.

16. A graphic digitizer as in claim 7 wherein said maximum number of elongated loops that enclose a single location on said work surface is three and said plurality of conductors is seven.

17. A method for determining the position of a freely movable pointer including coil means relative to a base unit including a first grid of spaced conductors defining locations of a work surface on said base unit, said method comprising the steps of:
  a. forming a plurality of phase conductors in said base unit, said phase conductors being formed as overlapping, elongated loops that collectively span all locations of the work surface defined by said first grid conductors;
  b. inductively coupling a phase reference signal between said coil means in said pointer and one of said phase conductors;
  c. inductively coupling locating signals between said coil means and selected conductors of said first grid; and
  d. responsive to said inductively coupled locating signals and said inductively coupled phase reference signal, determining the location of said pointer relative to the work surface defined by said first grid.

18. A method as in claim 17 wherein said forming step comprises the step of forming at least three phase conductors in overlapping elongated loops, said loops being formed in one direction only and being spaced so that all locations defined by said first grid conductors lie within loops formed by a minority of said phase grid conductors.

19. A method as in claim 18 further including the step of selecting from said phase conductors one that forms a loop enclosing the center of said coil means.

20. A method for determining the position of a coil in relation to a work surface defined by a first grid of conductors and having a second, phase grid comprising a plurality of conductors, said method comprising the steps of:
  a. forming each of said phase grid conductors into at least one elongated loop, said loops overlapping and being spaced such that all locations on said work surface lie within loops formed by a minority of said phase grid conductors;
  b. exciting the coil to induce signals in the conductors of both grids, the induced signals having a magnitude and polarity depending upon the location of the coil relative to the conductors;
  c. using as a source of phase reference, a phase grid conductor having an induced signal magnitude greater than a predetermined magnitude, detecting the relative polarities of signals induced in all phase grid conductors; and
  d. using as a source of phase reference, a phase grid conductor having the induced signal relative polarity of the minority of phase grid conductors, detecting the magnitude and polarity of the signals induced in the first grid.

21. A method for determining the position of a coil in relation to a work surface defined by a first grid of conductors and having a second, phase grid comprising a plurality of conductors, said method comprising the steps of:
  a. forming each of said phase grid conductors into at least one elongated loop, said loops overlapping and being spaced such that all locations on said work surface lie within loops formed by a minority of said phase grid conductors;
  b. exciting the coil to induce signals in the conductors of both grids, the induced signals having a magnitude and polarity depending upon the location of the coil relative to the conductors;
  c. connecting a phase grid conductor having an induced signal magnitude greater than a predetermined magnitude to detecting means to serve as a phase reference source;
  d. connecting each of said phase grid connectors, one at a time to the detecting means to determine the relative polarities of the induced signals;
  e. connecting a phase grid conductor having the same induced signal relative polarity as the minority of phase grid conductors to the detecting means to serve as a phase reference source; and
  f. selectively connecting the first grid conductors to the detecting means to determine the magnitude and polarity of the induced signals.

* * * * *